(12) United States Patent
Palenius et al.

(10) Patent No.: US 8,169,973 B2
(45) Date of Patent: May 1, 2012

(54) POWER EFFICIENT ENHANCED UPLINK TRANSMISSION

(75) Inventors: Torgny Palenius, Barsebäck (SE); Fredrik Gunnarsson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 975 days.

(21) Appl. No.: 11/961,135

(22) Filed: Dec. 20, 2007

(65) Prior Publication Data

US 2009/0161632 A1 Jun. 25, 2009

(51) Int. Cl.
*H04W 4/00* (2009.01)
*H04B 7/216* (2006.01)

(52) U.S. Cl. ........................................ 370/332; 370/335
(58) Field of Classification Search ........................ None
See application file for complete search history.

(56) References Cited

U.S. PATENT DOCUMENTS

| | | | | |
|---|---|---|---|---|
| 2003/0112880 A1* | 6/2003 | Walton et al. | ................. | 375/260 |
| 2003/0193913 A1* | 10/2003 | Murata et al. | ................. | 370/332 |
| 2004/0018849 A1* | 1/2004 | Schiff | ........................... | 455/522 |
| 2005/0249133 A1* | 11/2005 | Terry et al. | .................... | 370/278 |
| 2006/0062167 A1* | 3/2006 | Golitschek et al. | ........... | 370/293 |
| 2006/0121955 A1* | 6/2006 | Shlomot | ....................... | 455/574 |
| 2008/0235526 A1* | 9/2008 | Lee | ................. | 713/320 |
| 2009/0154403 A1* | 6/2009 | Niwano | ........................ | 370/329 |

FOREIGN PATENT DOCUMENTS

GB 2415868 A 1/2006

* cited by examiner

*Primary Examiner* — John Blanton

(57) ABSTRACT

A method and arrangement in a mobile terminal such as a UE for selecting a transport format for an uplink transmission to a base station, wherein the selector selects a transport format from a set of transport formats which are generated based upon parameters of a radio connection established with the base station. Upon establishing a radio connection, the base station sends parameters to the UE describing a radio bearer configuration. The UE generates a set of transport formats based upon the radio bearer parameters. A classifier then classifies each of the transport formats in the set as either power-efficient or power-inefficient. When a grant is received from the base station, the UE derives a set of allowed transport formats. A transport format selector then selects a transport format that is both power-efficient and allowed.

13 Claims, 7 Drawing Sheets

POWER EFFICIENT ENHANCED UPLINK TRANSMISSION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

The present invention relates to mobile telecommunications. More particularly, and not by way of limitation, the present invention is directed to a system and method for selecting power-efficient Enhanced Uplink Transport Format Combinations (E-TFCs) for power control of uplink transmissions.

Conventional mobile communication systems set up communication among multiple mobile terminals (for example, User Equipment (UE) devices) and base stations on a multitude of channels, where uplink transmissions are transmissions from the UE to the base station and downlink transmissions are transmissions from the base station to the UE. Some signaling protocols specify uplink transmissions on more than one channel, such as a control channel and a data channel. Thus, transmitter circuitry of the UE may transmit on one or more adjacent channels, possibly leading to adjacent channel interference. Accordingly, it is necessary to control the transmitter circuitry to avoid such issues.

In wide-band CDMA (WCDMA), the transmitter circuitry can be controlled to reduce adjacent channel interference problems by performing rate selection, which includes selecting the data rate and coding scheme (also known as Transport Format Combination (TFC) selection) for a signal transmission or burst to control the transmitter's power amplifier. In newer specifications for WCDMA, there are at least five channels that need to be supported for uplink transmission: the Dedicated Physical Control Channel (DPCCH), the Dedicated Physical Data Channel (DPDCH), the High Speed Dedicated Physical Control Channel (HS-DPCCH), the Enhanced Dedicated Physical Control Channel (E-DPCCH), and the Enhanced Dedicated Physical Data Channel (E-DPDCH). The rate selection for the enhanced uplink channels (E-DPCCH and E-DPDCH) is referred to as enhanced transport format combination (E-TFC). Each channel has a corresponding gain factor ($\beta_c$, $\beta_d$, $\beta_{hs}$, $\beta_{ec}$, $\beta_{ed}$) determining the power offsets between the channels, and each channel has a corresponding spreading factor, I or Q branch assignment, and channelization code. In addition, there can be 1, 2, or 4 E-DPDCHs. Many thousands of different transmitter configurations are possible given the range of values possible for the gain parameters, number of codes, and spreading factors.

In the 3GPP release 99, the Radio Network Controller (RNC) controls resources and user mobility. Resource control in this context relates to admission control, congestion control, and channel switching (roughly changing the data rate of a connection). Furthermore, a dedicated connection is carried over a Dedicated Channel (DCH), which is realized as the DPCCH and the DPDCH.

In the evolved 3G standards, the trend is to decentralize decision making, and in particular the control over the short term data rate of the user connection. The uplink data is allocated to an Enhanced Dedicated Channel (E-DCH), which operates similarly to the DCH. The E-DCH is realized as the DPCCH, which is continuous; the E-DPCCH for data control; and the E-DPDCH for data. The two latter channels are only transmitted when there is uplink data in the send buffer to send. Hence the Node B uplink scheduler determines which transport formats each user may use over the E-DPDCH. The RNC, however, is still responsible for admission control.

FIG. 1 is a simplified functional block diagram of a conventional uplink power control mechanism 10. Uplink power control is divided between an inner loop power control mechanism 11 and an outer loop power control mechanism 12. A receiver 13 receives a baseband signal 14 and generates a DPCCH signal-to-interference ratio (DPCCH_SIR) 15. The DPCCH_SIR is input to the inner loop power control mechanism 11. The inner loop power control mechanism is a conventional DCH power control mechanism. The outer loop power control mechanism 12 adjusts a DPCCH_SIR target 16 to ensure that the E-DPDCH is operating at the correct power level by monitoring the number of retransmissions in a Hybrid Automatic Repeat Request (HARQ) receiver (not shown). The DPCCH_SIR target is input to the inner loop power control mechanism 11, which compares the target with the DPCCH_SIR received from the receiver to produce power control (PC) commands 17. Thus, the E-DPDCH is maintained by outer loop power control, while the DPCCH quality is related to the offset $\beta_{ed}/\beta_c$ between DPCCH and DPDCH.

For the DCH, the outer loop power control mechanism 12 adjusts the DPCCH_SIR target 16 to ensure that the DPDCH operates at the correct power level by monitoring whether or not the transport blocks are correctly received.

The data transmission configuration over E-DPDCH is predefined as a number of E-TFCs. Each E-TFC is associated with a number of data blocks, each with 320 data bits; a spreading factor; a number of scrambling codes; a power offset, which determines the E-DPDCH power relative the DPCCH power; a code rate for each transmission and subsequent retransmissions, if needed; and the like. Many aspects must be considered when determining how these parameters should be configured. The power offsets per E-TFC may be signaled to the UE, or may be computed by the UE. If the UE computes the E-TFC power offsets, the computation is based on the signaled power offsets of a set of reference E-TFCs.

The Node B scheduler allocates resources to UEs by signaling a maximum allowed power offset over the Absolute Grant Channel (AGCH). By comparing this maximum allowed power offset to the power offset per E-TFC, this restricts which E-TFCs the UE is allowed to use. The available power in the UE and the amount of data in the UE send buffer may further restrict which E-TFC that the UE will use when transmitting data.

The required E-DPDCH power to fulfill the outer loop depends primarily on the data rate and the code rate. The power increases with the data rate if the code rate is constant, and the power increases with the code rate. When transport formats are configured in a way that uses high code rates (>0.5), these transport formats provide relatively little data protection in terms of coding, and require relatively high signal quality at the receiver.

If the (signaled or calculated) power offset between the DPCCH and the E-DPDCH for a particular transport format is insufficient, it leads to many retransmissions. In response, the DPCCH_SIR target is increased in the outer loop power control, and therefore it has an impact on the transmitted power of all channels, including both the E-DPDCH and DPCCH, during the time period after the high code rate was used until the outer loop power control has converged to a lower level again. The increased DPCCH_SIR target also causes too many retransmissions of the current transport block since the outer loop is at a level too low for the E-TFC. The block error rate (BLER) also increases, as does retransmission at the RLC layer, which further increases the delay and the used power per transport block. This has a negative impact on the required power per bit for successful communication.

FIG. 2 is a graph of relative energy per kilobit for the E-DPDCH and DPCCH as a function of the EUL bit rate when utilizing a conventional power control mechanism. The energy per kilobit is shown for different transport formats relative to the first transport format. If the code rate is held roughly equal in the different transport formats, the expected behavior would be a monotonically decreasing curve, since the cost of the DPCCH would diminish as the data rate and the power increases. Instead, transport formats with high code rates are identified as relatively power inefficient.

FIG. 3 is a conventional graph of code rate as a function of the EUL bit rate. FIG. 3 illustrates that as the code rate increases, the EUL bit rate increases. At a code rate of approximately 0.75, another code is added, reducing the code rate to approximately 0.4. Thereafter, with increasing code rate, the EUL bit rate increases, but at a lower rate due to the additional code. A disadvantage of adding additional codes is that the complexity and cost of the base station is correspondingly increased.

It would be advantageous to have a system and method that overcomes the disadvantages of the prior art by avoiding the power inefficient transport formats for data transmission. The present invention provides such a system and method.

BRIEF SUMMARY OF THE INVENTION

The present invention provides a system and method that identifies power-inefficient transport formats and avoids them. The power inefficient transport formats may be identified, for example, by the code rate of the first transmission. The invention enables the use of high data rates while decreasing required power. The power reduction may be in the range of 25-30 percent.

Thus, in one aspect, the present invention is directed to a method in a mobile terminal for selecting a transport format for an uplink transmission to a base station. The method includes the steps of receiving parameters from the base station that describe a radio bearer configuration upon establishing a radio connection with the base station; generating a set of transport formats based upon the radio bearer parameters; and classifying each of the transport formats in the set as either power-efficient or power-inefficient. The method also includes receiving a grant from the base station; utilizing the grant to derive a set of allowed transport formats; and selecting a transport format that is both power-efficient and included in the set of allowed transport formats.

In another aspect, the present invention is directed to an arrangement in a mobile terminal for selecting a transport format for an uplink transmission to a base station. The arrangement includes means for generating a set of transport formats based upon parameters of a radio bearer for a radio connection with the base station; means for classifying each of the transport formats in the set as either power-efficient or power-inefficient; means for utilizing a grant received from the base station to derive a set of allowed transport formats; and means for selecting a transport format that is both power-efficient and included in the set of allowed transport formats.

In yet another aspect, the present invention is directed to a transport format selector in a mobile terminal for selecting a transport format for an uplink transmission to a base station, wherein the selector selects a transport format from a set of transport formats which are generated based upon parameters of a radio connection established with the base station. The selector includes means for accessing information regarding which transport formats in the set are power-efficient transport formats; means for accessing information regarding which transport formats in the set are allowed based upon a grant received from the base station; and means for selecting a transport format that is both power-efficient and allowed.

In one embodiment, the means for selecting a transport format includes means for selecting an allowed power-efficient transport format having the highest data rate that can be filled with the data in the mobile terminal send buffer. Hence, there is no meaning selecting a transport format with a higher data rate than what can be filled with the currently available data in the send buffer. In another embodiment, the selector determines a first allowed transport format having the highest data rate that can be filled with the data in the mobile terminal send buffer, and if the determined first transport format is not power-efficient, the selector temporarily selects an allowed power-efficient second transport format with a data rate lower than the determined first transport format. This gradually increases the amount of data in the send buffer, and eventually the selector determines that there is enough data in the send buffer to fill an allowed power-efficient third transport format. This determined third transport format is then used for data transmission until the amount of data in the send buffer is decreased to a level that cannot fill the power-efficient third transport format. The selector then returns to an allowed power-efficient second transport format. The selector may continue to alternate between allowed power-efficient transport formats with data rates lower and higher than the determined first transport format, thereby averaging a data rate approximately equal to the highest data rate that corresponds to the amount of data in the send buffer, while utilizing only power-efficient transport formats. In some cases, if the send buffer has excess capacity, the selector may select a maximum-allowed transport format that is inefficient so as not to limit the maximum throughput of the mobile terminal.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

The present invention provides a system and method that identifies power-inefficient transport formats and avoids them. When the radio bearer is established, the UE identifies the power-inefficient E-TFCs by computing the code rate of the first transmission attempt. Then, E-TFCs with a first transmission code rate of a threshold code rate (Cmax) or higher are considered power-inefficient. In different embodiments of the present invention, the threshold Cmax may be:

constant and predefined;
updated based on mode selections in the UE (for example, via selection of a power saving mode);
adapted to the battery status of the UE;
updated based on the number of retransmissions per E-TFC (code rate); or
updated based on the noise level in the network.

Figure 4:
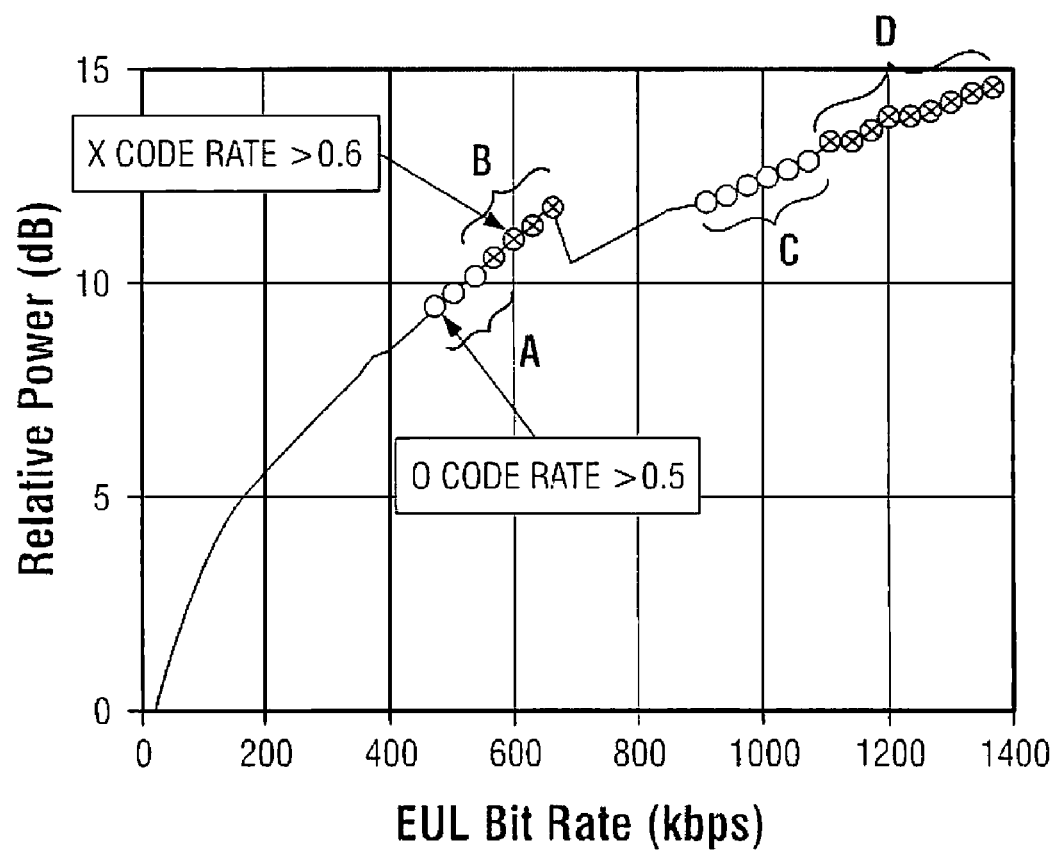
FIG. 4 is an exemplary graph of relative power as a function of the EUL bit rate when utilizing the present invention.

FIG. 4 is an exemplary graph of relative power as a function of the EUL bit rate when utilizing the power control method of the present invention. The power is relative to the first or lowest transport format. FIG. 4 illustrates the impact of two different settings of Cmax on the number of transport formats that are considered power-inefficient. The example considers UE category 3 transport formats and two different exemplary settings of Cmax (in this example, 0.5 and 0.6).

Figure 5:
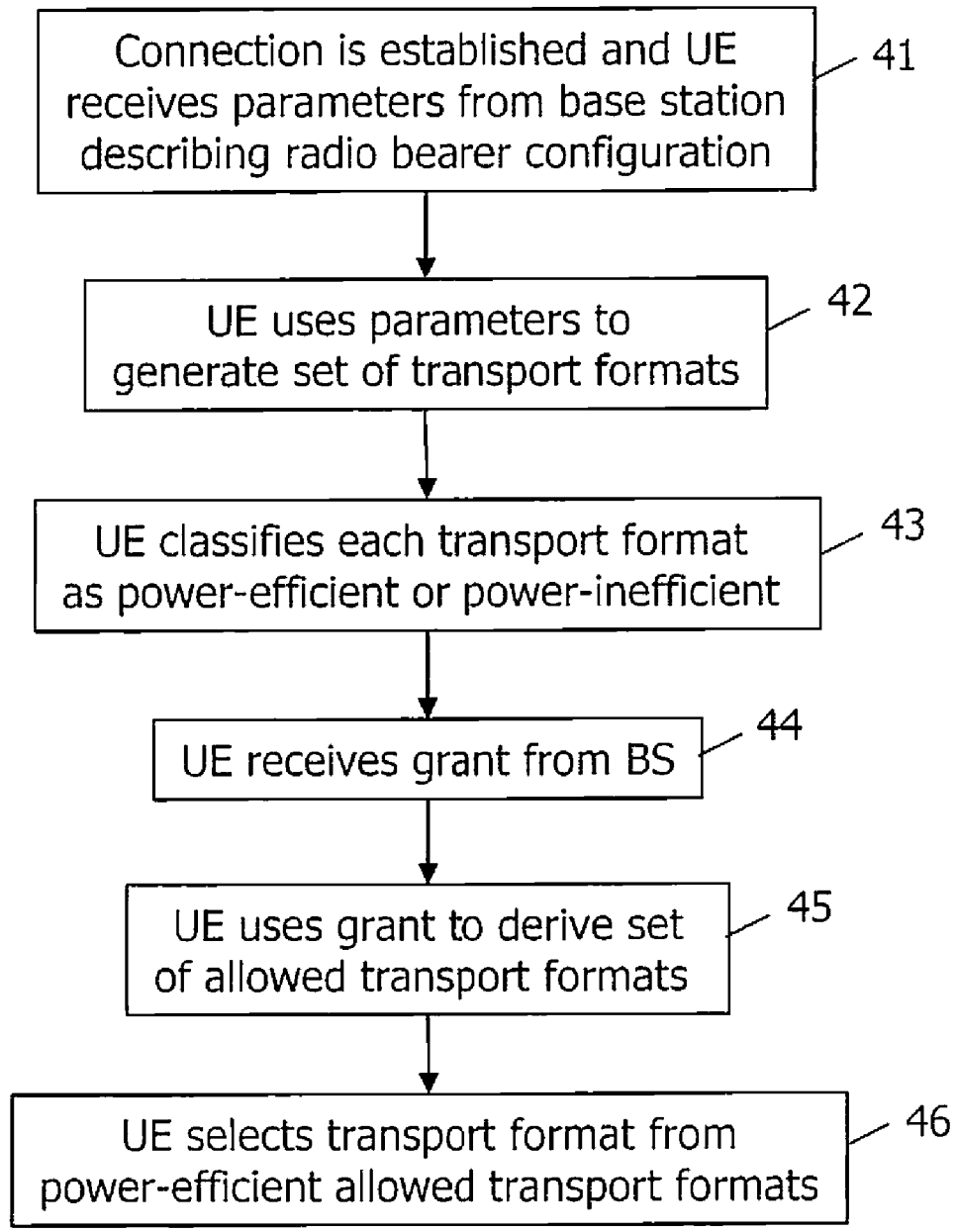
FIG. 5 is a flow chart illustrating the steps of an exemplary embodiment of the method of the present invention.

FIG. 5 is a flow chart illustrating the steps of an exemplary embodiment of the method of the present invention. At step 41, when a connection is established, the UE receives parameters from the base station (BS) that describe the radio bearer (RB) configuration. At step 42, the UE uses the RB parameters to generate a set of E-TFCs. Each E-TFC corresponds to a data rate and is characterized by a number of properties. At step 43, based on the E-TFC properties and power-inefficiency criteria, the UE classifies each of the E-TFCs as either power-efficient or power-inefficient. At step 44, the UE receives a grant from the BS. At step 45, the UE utilizes the grant to derive a set of allowed E-TFCs that the UE is entitled to use. At step 46, the UE selects an E-TFC for the transmission considering the allowed E-TFCs as well as whether the E-TFCs are power-efficient.

Figure 1:
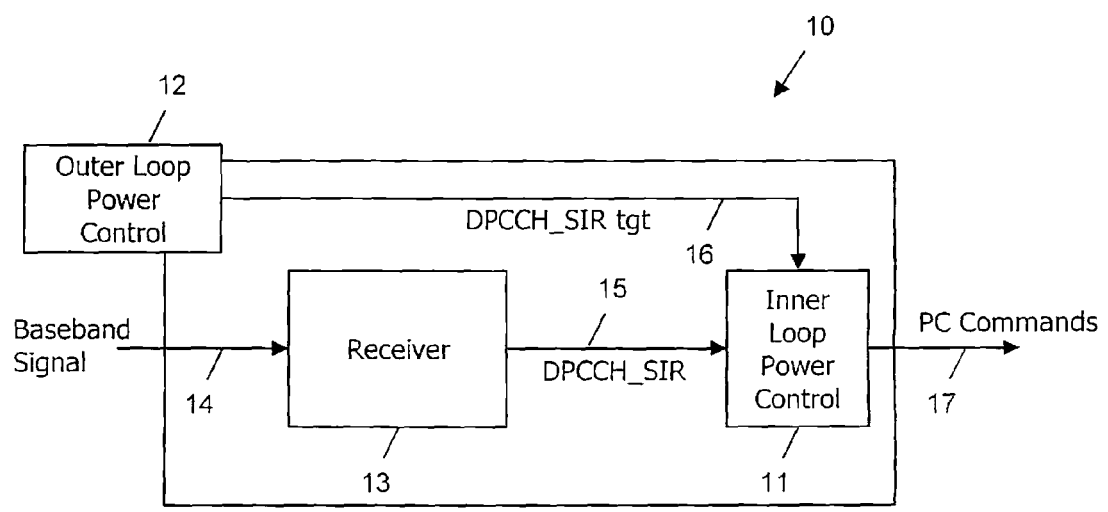
FIG. 1 (Prior Art) is a simplified functional block diagram of a conventional uplink power control mechanism.
Figure 2:
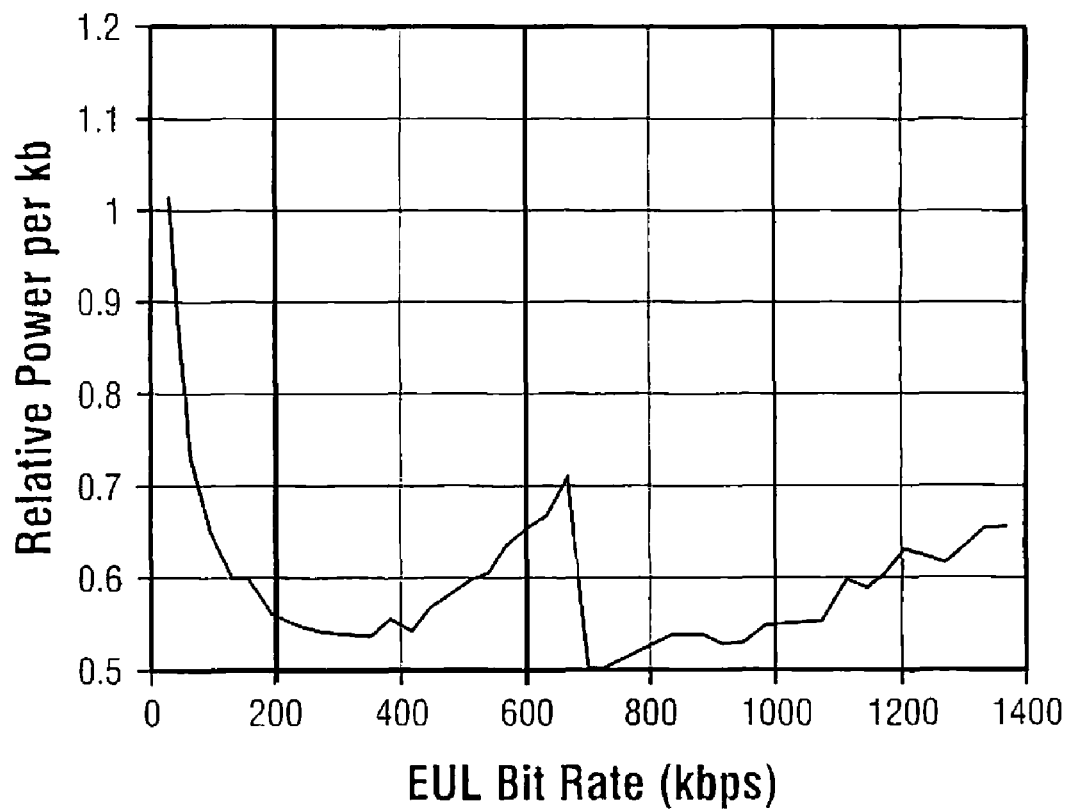
FIG. 2 (Prior Art) is a graph of relative energy per kilobit as a function of the EUL bit rate when utilizing a conventional power control mechanism.
Figure 3:
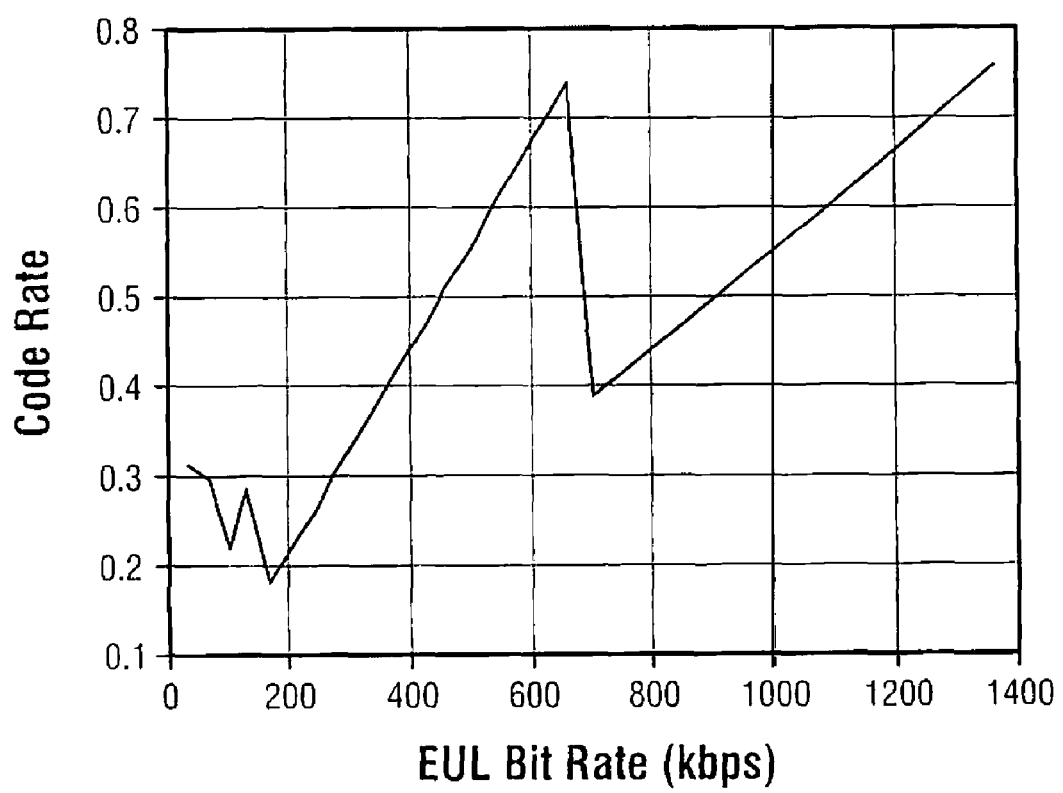
FIG. 3 (Prior Art) is a conventional graph of code rate as a function of the EUL bit rate.

In a first embodiment of a process for selecting an E-TFC, the UE always avoids power-inefficient E-TFCs. Step 43 is characterized by setting Cmax at a threshold level to determine the number of power-inefficient E-TFCs that are excluded from use. For example, referring again to FIGS. 3 and 4, if Cmax is set to a code rate of 0.5 or greater, the E-TFCs in groups A and C are allowed, while the higher data rate E-TFCs in groups B and D are not allowed. Although this setting is power-efficient, it has the drawback that the UE is prevented from selecting a higher data rate E-TFC. If Cmax is set to a code rate of 0.76 or greater, as shown in the example in FIG. 3, all of the illustrated E-TFCs in groups A-D are allowed.

In another embodiment, a first E-TFC is only considered power-inefficient if there exists at least one power-efficient second E-TFC, and the data rate of the second E-TFC is higher than the data rate of the first E-TFC. Using this power-inefficiency classification, groups A and B are classified as power inefficient (only group B for Cmax=0.6), while groups C and D are classified as power efficient since there are no power-efficient E-TFCs with higher data rates.

Figure 6:
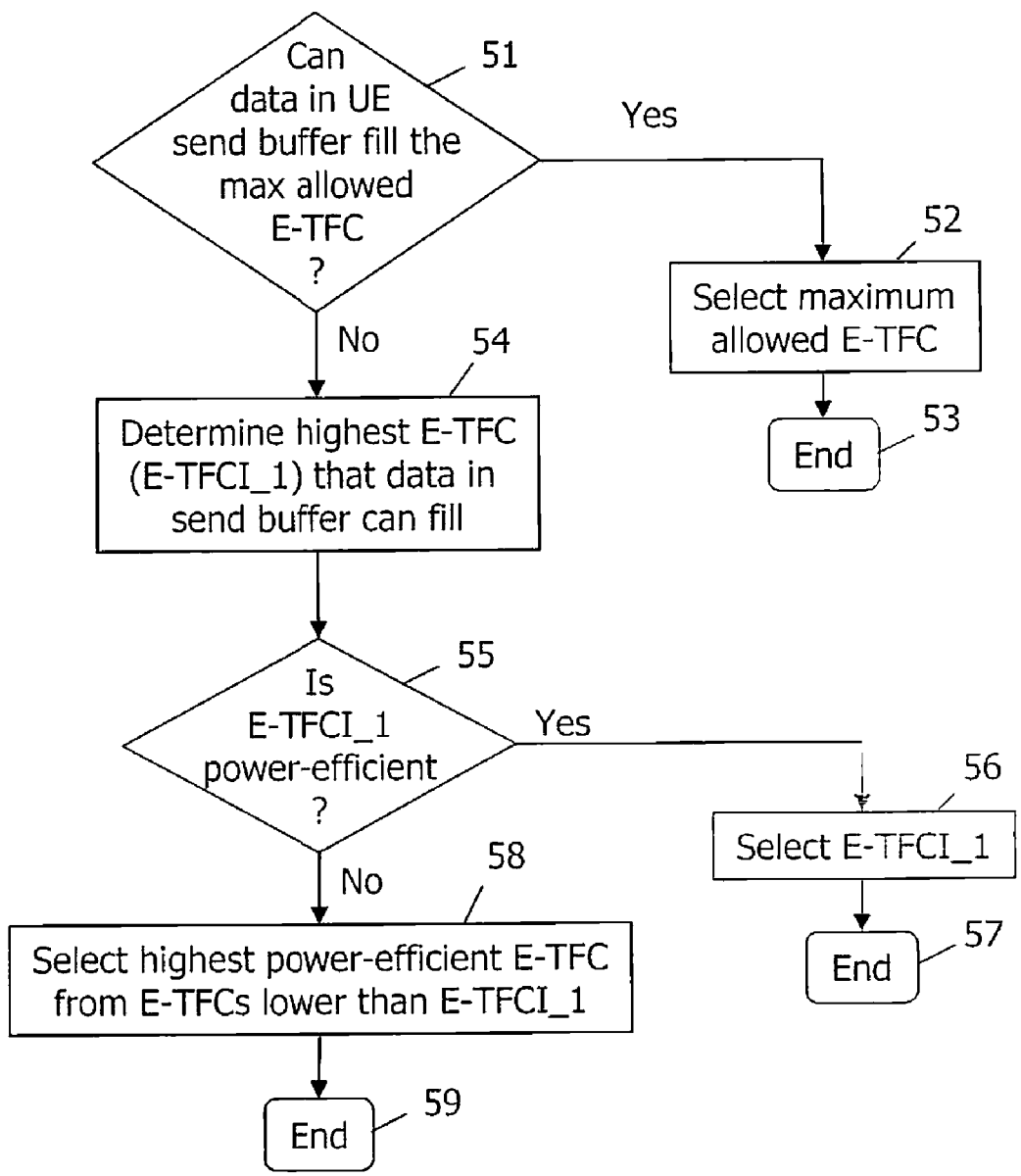
FIG. 6 is a flow chart of a second embodiment of a process for selecting a transport format.

FIG. 6 is a flow chart of a second embodiment of a process for selecting an E-TFC. In the second embodiment, the UE only avoids a power-inefficient E-TFC if the set of allowed E-TFCs includes higher data rate E-TFCs that are considered power-efficient. In order to provide a given data rate that corresponds to a power-inefficient E-TFC, the UE alternates between power-efficient E-TFCs corresponding to data rates higher than the given data rate and E-TFCs corresponding to data rates lower than the given data rate.

Each E-TFC is numbered by an EUL Transport Format Combination Indicator (E-TFCI) increasing with data rate. The UE may select an E-TFC using the following procedure. At step 51, the UE determines whether the data in the UE's send buffer can fill the maximum allowed E-TFC. If so, the process moves to step 52 where the UE selects the maximum E-TFC. The selection process then ends at step 53. However, if there is not enough data in the UE's send buffer to fill the maximum allowed E-TFC, the process moves to step 54, where the UE determines the highest E-TFC that data in the UE's send buffer can fill. This E-TFC is denoted as E-TFCI_1. At step 55, the UE determines whether E-TFCI_1 is power-efficient. If E-TFCI_1 is defined as power-efficient, the process moves to step 56 where E-TFC_1 is selected. The process then ends at step 57.

However, if E-TFCI_1 is defined as power-inefficient at step 55, the process moves to step 58 where the UE selects the highest power-efficient E-TFC among all E-TFCs lower than E-TFCI_1. With this process, the UE utilizes a lower data rate than required by the amount of data in the send buffer. However this, in turn, increases the amount of data in the send buffer size over time. Thus, in future TTIs, when the process is run again, the larger amount of data in the send buffer will result in the process moving to step 52 or step 56 where either the maximum allowed E-TFC or a power-efficient E-TFC_1 will be selected. Over a longer period of time, by alternating between data rates above and below the data rate corresponding to the power-inefficient E-TFCI_1, the average data rate approximates the data rate corresponding to the power-inefficient E-TFCI_1, while utilizing only power-efficient transport formats.

Figure 7:
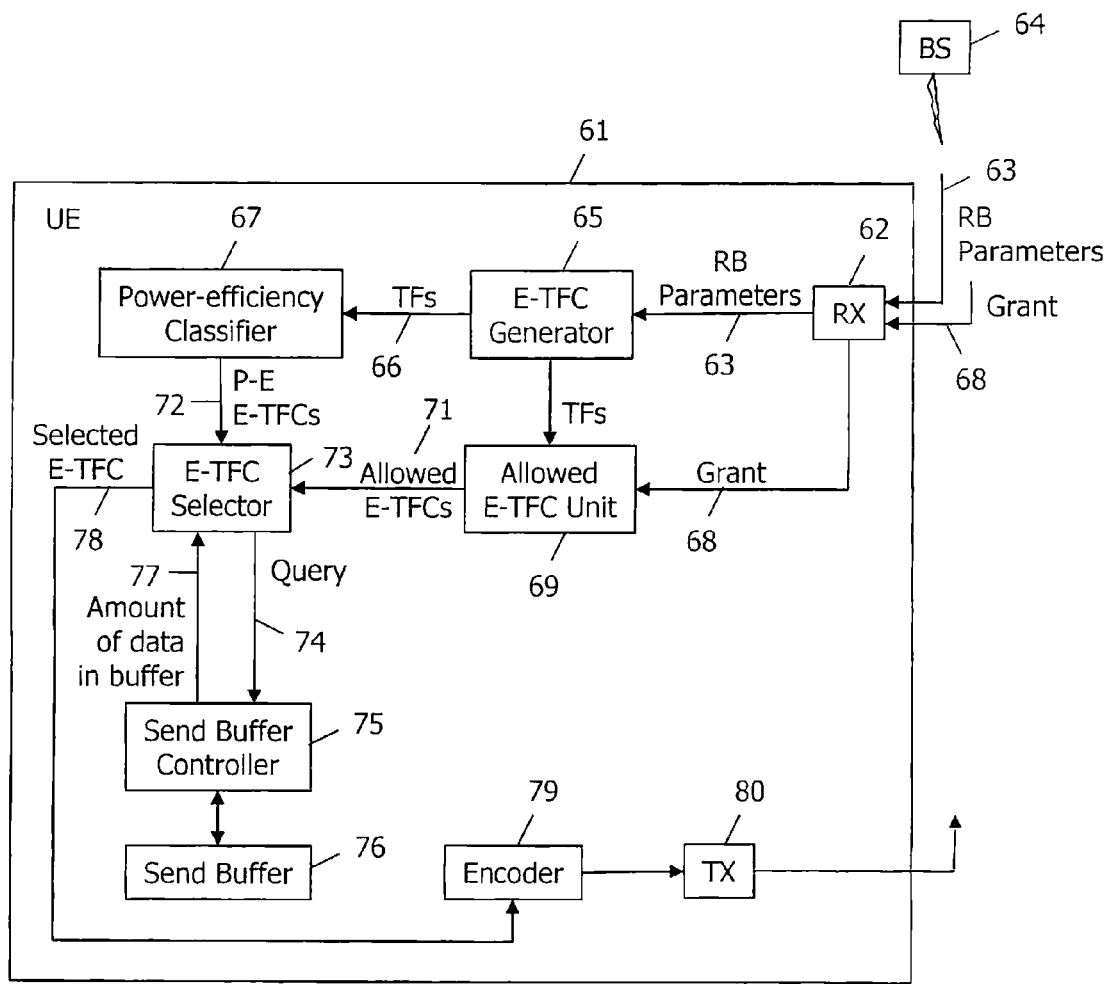
FIG. 7 is a simplified block diagram of a mechanism within a UE for selecting a transport format in accordance with the teachings of the present invention.

FIG. 7 is a simplified block diagram of a mechanism within a UE 61 for selecting an E-TFC in accordance with the teachings of the present invention. A receiver (RX) 62 receives the radio bearer (RB) parameters 63 from the BS 64. The RB parameters are passed to an E-TFC generator 65, which generates a set of E-TFCs 66. The E-TFCs are passed to a power-efficiency classifier 67, which classifies each of the E-TFCs as either power-efficient or power-inefficient based on the E-TFC properties and power-inefficiency criteria.

The RX 62 also receives a grant 68 from the BS 64. The grant is passed to an allowed E-TFC unit 69, which utilizes the grant to derive a set of allowed E-TFCs 71 that the UE is entitled to use. Identifiers of the power-efficient E-TFCs 72 and the allowed E-TFCs 71 are passed to an E-TFC selector 73, which selects an E-TFC for the transmission considering the allowed E-TFCs as well as whether the E-TFCs are power-efficient.

In one embodiment of the present invention, the E-TFC selector 73 sends a query 74 to a send buffer controller 75 requesting the amount of data in the UE's send buffer. The send buffer controller returns an indication of the amount of data in the send buffer. The E-TFC selector then determines whether the data in the send buffer can fill the maximum allowed E-TFC. If so, the E-TFC selector selects the maximum allowed E-TFC. However, if the data in the send buffer cannot fill the maximum allowed E-TFC, the E-TFC selector determines the highest E-TFC that data in the UE's send buffer can fill (i.e., E-TFCI_1). The E-TFC selector then determines whether E-TFCI_1 is power-efficient. If E-TFCI_1 is defined as power-efficient, the E-TFC selector selects E-TFC_1. However, if E-TFCI_1 is not power-inefficient, the E-TFC selector selects the highest power-efficient E-TFC among all E-TFCs lower than E-TFCI_1.

If E-TFCI_1 is not a power-efficient E-TFC, the E-TFC selector 73 performs the process illustrated in steps 56-58 of FIG. 6. Thus, the E-TFC selector alternately selects power-efficient E-TFCs with data rates above and below the data rate corresponding to the power-inefficient E-TFCI_1. In this way, the average data rate approximates the data rate corresponding to the power-inefficient E-TFCI_1, while utilizing only power-efficient E-TFCs.

The selected E-TFC 78 is sent to an encoder 79 and a transmitter (TX) 80 for uplink transmission to the base station 64.

It should also be recognized that in other embodiments of the present invention, different combinations of some or all of the E-TFC generator 65, power-efficiency classifier 67, allowed E-TFC unit 69, E-TFC selector 73, and to some extent the send buffer controller 75 may be implemented in a single unit referred to as an E-TFC selector.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a mobile terminal for selecting a power-efficient Enhanced Uplink Transport Format Combination, E-TFC, for an uplink transmission to a base station, said method comprising the steps of:
    upon establishing a radio connection with the base station, receiving parameters from the base station that describe a radio bearer configuration;
    generating a group of E-TFCs based upon the radio bearer parameters;
    classifying each of the E-TFCs in the group as either power-efficient or power inefficient based on transport properties of each of the E-TFCs and a maximum code rate (Cmax) for the E-TFCs classified as power-efficient;
    receiving a grant from the base station;
    utilizing the grant to derive a set of allowed E-TFCs from the group; and
    selecting an allowed E-TFC from the set of allowed E-TFCs, wherein the step of selecting the allowed E-TFC from the set includes the steps of:
        determining an allowed, power-efficient E-TFC with the highest data rate from among the allowed E-TFCs in the set that are also power-efficient;
        determining whether the allowed, power-efficient E-TFC with the highest data rate can be filled by the data in a send buffer in the mobile terminal; and
        if the data in the send buffer can fill the allowed, power-efficient E-TFC with the highest data rate, selecting the allowed, power-efficient E-TFC with the highest data rate;
        if the data in the send buffer cannot fill the allowed, power-efficient E-TFC with the highest data rate:
            selecting an allowed E-TFC with a lower, second data rate that the data in the send buffer can fill;
            determining whether the allowed E-TFC with the second data rate is power-efficient;
            if the allowed E-TFC with the second data rate is power-efficient, selecting the allowed, power-efficient E-TFC with the second data rate; and
            if the allowed E-TFC with the second data rate is not power-efficient, sequentially selecting different allowed, power-efficient E-TFCs with progressively lower data rates lower than the second data rate until the data in the send buffer can fill one of the allowed, power-efficient E-TFCs with a data rate higher than the second data rate, or alternately selecting one of the allowed, power-efficient E-TFCs with a data rate lower than the second data rate and one of the allowed, power-efficient E-TFCs with a data rate higher than the second data rate.

2. The method as recited in claim 1, wherein Cmax is a constant and predefined code rate.

3. The method as recited in claim 1, wherein Cmax is a variable code rate, which varies based upon a power-saving mode selection in the mobile terminal.

4. The method as recited in claim 1, wherein Cmax is a variable code rate, which varies based upon a battery status of the mobile terminal.

5. The method as recited in claim 1, wherein Cmax is a variable code rate, which varies based upon a number of retransmissions required per code rate.

6. The method as recited in claim 1, wherein a first E-TFC is only considered power-inefficient if there exists at least one power-efficient second E-TFC, and the data rate of the second E-TFC is higher than the data rate of the first E-TFC.

7. An arrangement in a mobile terminal for selecting a power-efficient Enhanced Uplink Transport Format Combination, E-TFC, for an uplink transmission to a base station, said arrangement comprising:
    a processor coupled to a non-transitory memory that stores computer program instructions, wherein when the processor executes the computer program instructions, the processor causes the arrangement to:
    generate a group of E-TFCs based upon parameters of a radio bearer for a radio connection with the base station;
    classify each of the E-TFCs in the group as either power-efficient or power-inefficient, wherein transport properties of each of the E-TFCs are compared with a maximum code rate (Cmax) for the E-TFCs classified as power-efficient;
    utilize a grant received from the base station to derive a set of allowed E-TFCs from the group; and
    select an allowed E-TFC from the set of allowed E-TFCs;
    wherein the arrangement is configured to determine an allowed, power-efficient E-TFC with the highest data rate from among the allowed E-TFCs in the set that are also power-efficient, to determine whether the allowed, power-efficient E-TFC with the highest data rate can be filled by the data in a send buffer in the mobile terminal, and to select the allowed, power-efficient E-TFC with the highest data rate if the data in the send buffer can fill the allowed, power-efficient E-TFC with the highest data rate; and
    wherein if the data in the send buffer cannot fill the allowed, power-efficient E-TFC with the highest data rate, the arrangement is configured to:
        select an allowed E-TFC with a lower, second data rate that the data in the send buffer can fill;
        determine whether the allowed E-TFC with the second data rate is power-efficient;

select the allowed E-TFC with the second data rate in response to a determination that the allowed E-TFC with the second data rate is power-efficient; and in response to a determination that the allowed E-TFC with the second data rate is not power-efficient, to sequentially select allowed, power-efficient E-TFCs with progressively lower data rates lower than the second data rate until the data in the send buffer can fill one of the allowed, power-efficient E-TFCs with a data rate higher than the second data rate, or to alternately select one of the allowed, power-efficient E-TFCs with a data rate lower than the second data rate and one of the allowed, power-efficient E-TFCs with a data rate higher than the second data rate.

8. The arrangement as recited in claim 7, wherein Cmax is a constant and predefined code rate.

9. The arrangement as recited in claim 7, wherein Cmax is a variable code rate, which varies based upon a power-saving mode selection in the mobile terminal.

10. The arrangement as recited in claim 7, wherein Cmax is a variable code rate, which varies based upon a battery status of the mobile terminal.

11. The arrangement as recited in claim 7, wherein Cmax is a variable code rate, which varies based upon a number of retransmissions required per code rate.

12. A transport format selector in a mobile terminal for selecting a power-efficient Enhanced Uplink Transport Format Combination, E-TFC, for an uplink transmission to a base station, said selector selecting the power-efficient E-TFC from a group of E-TFCs, which are generated based upon parameters of a radio connection established with the base station, said transport format selector comprising:

a processor coupled to a non-transitory memory that stores computer program instructions, wherein when the processor executes the computer program instructions, the processor causes the transport format selector to:

receive from a power-efficiency classifier, information regarding which E-TFCs in the group are power-efficient E-TFCs, as determined by comparing transport properties of each of the E-TFCs with a maximum code rate (Cmax) for the E-TFCs classified as power-efficient;

receive from an allowed E-TFC unit, information regarding a set of allowed E-TFCs derived from the group based upon a grant received from the base station; and select an allowed E-TFC from the set of allowed E-TFCs;

wherein the transport format selector is configured to determine an allowed, power-efficient E-TFC with the highest data rate from among the allowed E-TFCs in the set that are also power-efficient, to determine whether the allowed, power-efficient E-TFC with the highest data rate can be filled by the data in a send buffer in the mobile terminal, and to select the allowed, power-efficient E-TFC with the highest data rate if the data in the send buffer can fill the allowed, power-efficient E-TFC with the highest data rate; and wherein if the data in the send buffer cannot fill the allowed, power-efficient E-TFC with the highest data rate, the transport format selector is configured to:

select an allowed E-TFC with a lower, second data rate that the data in the send buffer can fill;

determine whether the allowed E-TFC with the second data rate is power-efficient;

select the allowed E-TFC with the second data rate in response to a determination that the allowed E-TFC with the second data rate is power-efficient; and in response to a determination that the allowed E-TFC with the second data rate is not power-efficient, to sequentially select allowed, power-efficient E-TFCs with progressively lower data rates lower than the second data rate until the data in the send buffer can fill one of the allowed, power-efficient E-TFCs with a data rate higher than the second data rate, or to alternately select one of the allowed, power-efficient E-TFCs with a data rate lower than the second data rate and one of the allowed, power-efficient E-TFCs with a data rate higher than the second data rate.

13. The transport format selector as recited in claim 12, wherein if there is more data in the mobile terminal send buffer than that fills the allowed, power-efficient E-TFC with the highest data rate, the transport format selector is configured to select an allowed, power-inefficient E-TFC with a data rate higher than the data rate of the allowed, power-efficient E-TFC with the highest data rate so as not to limit a maximum throughput of the mobile terminal.

* * * * *

UNITED STATES PATENT AND TRADEMARK OFFICE
CERTIFICATE OF CORRECTION

PATENT NO.       : 8,169,973 B2                                              Page 1 of 1
APPLICATION NO.  : 11/961135
DATED            : May 1, 2012
INVENTOR(S)      : Palenius et al.

It is certified that error appears in the above-identified patent and that said Letters Patent is hereby corrected as shown below:

On the Title Page, in item (54), and in Column 1, Line 1, in Title,
delete "POWER EFFICIENT" and insert -- POWER-EFFICIENT --, therefor.

In Column 4, Line 52, delete "DRAWING" and insert -- DRAWINGS --, therefor.

In Column 5, Line 66, delete "power efficient" and insert -- power-efficient --, therefor.

In Column 6, Line 23, delete "E-TFC_1" and insert -- E-TFCI_1 --, therefor.

In Column 6, Line 34, delete "E-TFC_1" and insert -- E-TFCI_1 --, therefor.

In Column 7, Line 4, delete "E-TFC_1." and insert -- E-TFCI_1. --, therefor.

Signed and Sealed this
Second Day of October, 2012

David J. Kappos
*Director of the United States Patent and Trademark Office*